(12) United States Patent
Sternberg

(10) Patent No.: US 7,731,191 B2
(45) Date of Patent: Jun. 8, 2010

(54) CONFIGURABLE MANUAL CONTROLLER

(75) Inventor: Aaron B. Sternberg, Vancouver, WA (US)

(73) Assignee: IPPASA, LLC, Vancouver, WA (US)

( * ) Notice: Subject to any disclaimer, the term of this patent is extended or adjusted under 35 U.S.C. 154(b) by 187 days.

(21) Appl. No.: 12/278,102

(22) PCT Filed: Feb. 9, 2007

(86) PCT No.: PCT/US2007/003462

§ 371 (c)(1),
(2), (4) Date: Aug. 1, 2008

(87) PCT Pub. No.: WO2007/095082

PCT Pub. Date: Aug. 23, 2007

(65) Prior Publication Data

US 2009/0118012 A1    May 7, 2009

Related U.S. Application Data

(60) Provisional application No. 60/772,343, filed on Feb. 10, 2006.

(51) Int. Cl.
A63F 71/00 (2006.01)
(52) U.S. Cl. ................................. 273/148 B
(58) Field of Classification Search ............ 273/148 B; 463/36, 37; D21/333, 324; D14/401
See application file for complete search history.

(56) References Cited

U.S. PATENT DOCUMENTS

| | | | | |
|---|---|---|---|---|
| 4,712,184 A | * | 12/1987 | Haugerud | ............... 701/1 |
| 5,046,739 A | | 9/1991 | Reichow | |
| D338,053 S | * | 8/1993 | Underhill et al. | ........ D14/454 |
| 5,250,000 A | | 10/1993 | Boutin et al. | |
| 5,476,261 A | | 12/1995 | Hultstrand | |
| 5,645,277 A | | 7/1997 | Cheng | |
| 5,667,220 A | | 9/1997 | Cheng | |
| 5,692,956 A | * | 12/1997 | Rifkin | ............... 463/37 |
| 5,976,018 A | | 11/1999 | Druckman | |

(Continued)

FOREIGN PATENT DOCUMENTS

JP    2004-129704    4/2004

(Continued)

OTHER PUBLICATIONS

"Apple MA241G/A Nano Tubes for iPod Nano 1st Generation (5-pack)", [online], Sep. 17, 2005 [retrieved on Oct. 5, 2007], Retrieved from the Internet:<URL: http://www.amazon.com/gp/product/B000B9PXNE/ref=s9_asin_image_1/105-2671613-6265246?pf_rd_m=ATVPDKIKX0DER&pf_rd_s=center-1&pf_rd_r=0QD20ND59XMAG39HN7ME&pf_rd_t=01&pf_rd_p=278240701&pf_rd_i=507846>, 15 pages.

(Continued)

*Primary Examiner*—Raleigh W. Chiu
(74) *Attorney, Agent, or Firm*—Stoel Rives LLP

(57) ABSTRACT

A configurable manual controller (10, 140) for manipulating images or symbols on a display is adapted for construction with matable building elements (122) arranged by a user. The user forms the manual controller to exhibit a customized shape and ornamental appearance reflecting the user's game-inspired, ergonomic, or style preferences.

8 Claims, 20 Drawing Sheets

U.S. PATENT DOCUMENTS

| | | | |
|---|---|---|---|
| 6,193,609 B1* | 2/2001 | D'Achard Van Enschut | 463/37 |
| 6,241,247 B1 | 6/2001 | Sternberg et al. | |
| 6,290,565 B1 | 9/2001 | Galyean, III et al. | |
| 6,443,796 B1* | 9/2002 | Shackelford | 446/91 |
| 6,710,766 B1 | 3/2004 | Ogata | |
| 6,923,443 B1* | 8/2005 | Hughes, IV | 273/148 B |
| 6,932,341 B1* | 8/2005 | Kenyon | 273/148 B |
| 7,063,321 B2* | 6/2006 | Hussaini et al. | 273/148 B |
| RE39,409 E* | 11/2006 | Sternberg et al. | 273/148 B |
| D572,255 S* | 7/2008 | Li | D14/401 |
| 2002/0180148 A1* | 12/2002 | Koziel | 273/148 B |
| 2002/0195771 A1* | 12/2002 | Ku | 273/148 B |
| 2003/0109314 A1* | 6/2003 | Ku | 463/47 |
| 2005/0075172 A1* | 4/2005 | Coleman | 463/47 |
| 2005/0255915 A1 | 11/2005 | Riggs et al. | |
| 2005/0275165 A1* | 12/2005 | Hussaini et al. | 273/148 B |
| 2008/0122173 A1* | 5/2008 | Harris | 273/148 B |
| 2009/0118012 A1* | 5/2009 | Sternberg | 463/37 |

FOREIGN PATENT DOCUMENTS

WO     WO 99/36136     7/1999

OTHER PUBLICATIONS

International Search Report, International Application No. PCT/US 07/03462, dated Feb. 12, 2008, 2 pages.

* cited by examiner

CONFIGURABLE MANUAL CONTROLLER

RELATED APPLICATION

This application claims benefit of U.S. Provisional Patent Application No. 60/772,343, filed Feb. 10, 2006.

COPYRIGHT NOTICE

© 2007 Aaron B. Sternberg. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates to a manual controller for manipulating images or symbols on a visual display and, in particular, to a controller that can be constructed with user-arranged matable building elements to exhibit a customized shape and style depending on user game-inspired, ergonomic, or appearance preferences.

BACKGROUND INFORMATION

Manual controllers for manipulating images or symbols on a visual display of a computer device include, for example, joysticks, game pads, steering wheels, guns, mice, remote devices for television, stored multi-media display and recording machines, cellular telephones, portable video game systems, and portable multi-media devices. One prevalent type of manual controller comprises a control section having a plurality of buttons that the user presses to enter commands and hand grips that the user holds when the user operates the manual controller. Conventional manual controllers are distributed with a predetermined appearance and ergonomic structure. Manual controllers are operated by a variety of users with different hand sizes. Moreover, each user has different ergonomic and style preferences.

SUMMARY OF DISCLOSURE

A configurable manual controller for manipulating images or symbols on a display is adapted for construction with matable building elements arranged by a user. The user forms the manual controller to exhibit a customized shape and ornamental appearance reflecting the user's game-inspired, ergonomic, or style preferences.

The configurable manual controller comprises an exoskeleton having an interior region and a patterned surface portion. The interior region is configured to confine internal electrical components that are operatively connected to and cooperate with control actuators to produce signals for manipulating images or symbols on the display. The control actuators are positioned for tactile manipulation by a user to cause production of the signals. The patterned surface portion is configured to support a set of building elements. The building elements in the set are configurable for mating to the patterned surface portion of the exoskeleton and to one another. This enables a user to customize the controller to an arbitrary shape and ornamental appearance, according to the user's game-inspired, ergonomic, or style preferences.

In a first embodiment, the exoskeleton of a controller comprises a main section and a hand grip section, either or both of which includes at least one patterned surface portion on which a user can build with the building elements to create a controller of various shapes and appearances according to the user's preference. This can be accomplished by one or both of attachment and add-on techniques. In a second embodiment, the exoskeleton of a controller comprises a unitary main and hand grip section that includes at least one patterned surface portion on which a user can build with the building elements to create a customized controller. The resulting arbitrary controller configuration determined by a user can be, for example as described below, a golf club or a baseball bat.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
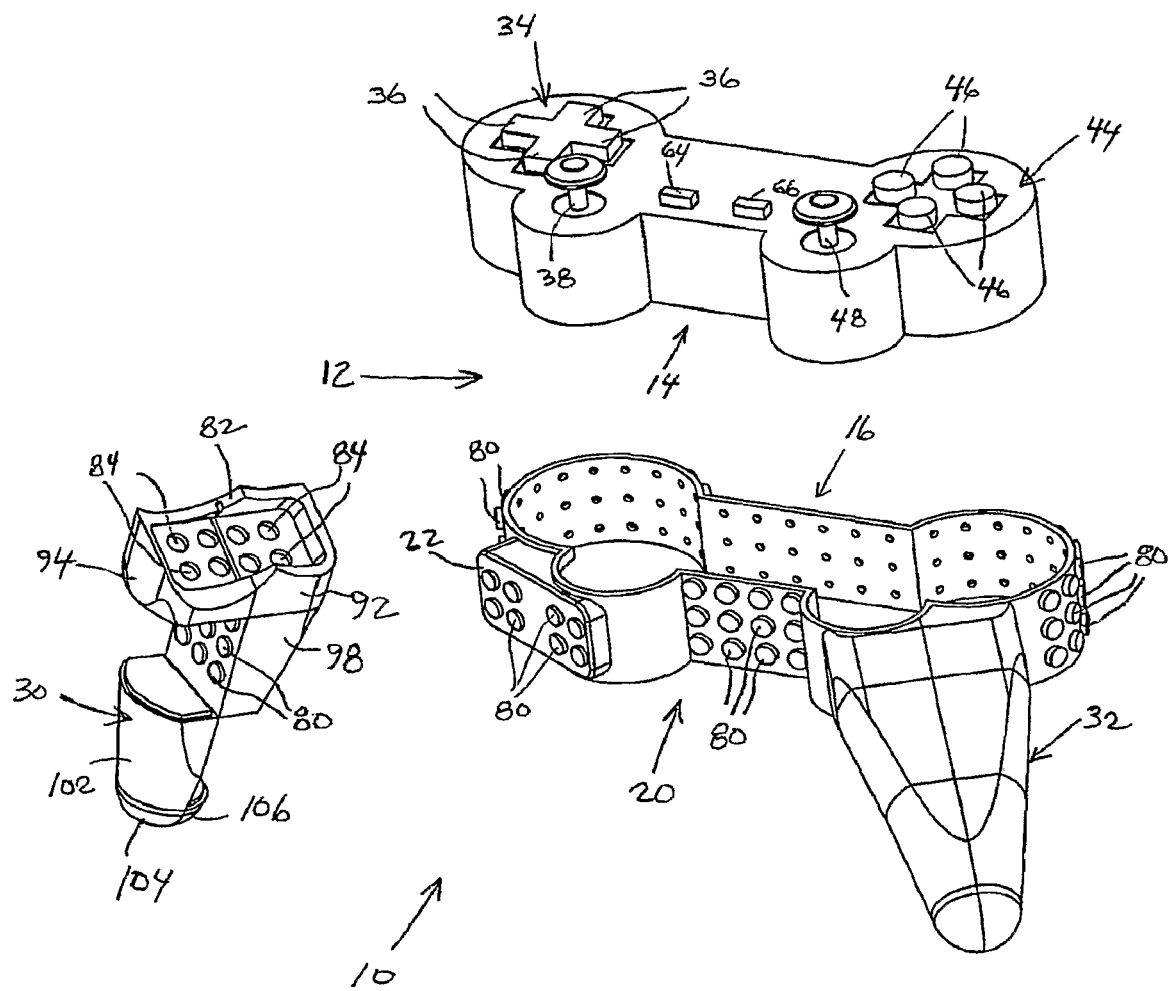
FIG. 1 is an exploded view of a first preferred embodiment of a configurable manual controller.

FIG. 1 is an exploded view of a first preferred embodiment of a configurable manual controller 10 that is used with a computing device (not shown) for manipulating images or symbols on a display (not shown). Although it does not show a cable, this embodiment can be connected to a computing device through a cable or a wireless communication link. Manual controller 10 includes an exoskeleton 12 formed of a main housing 14 and a main casing 16 that conformably fits around the side surface of main housing 14. Main housing 14 fits inside of but is readily separable from main casing 16. Main housing 14 houses in its interior the electrical components necessary for controlling symbols or images on a display associated with a computer device. Main casing 16 has a patterned surface portion 20 that in part covers hand grip mounting plates 22 (one shown) to which removable hand grips 30 and 32 can be attached as described below. Skilled persons will appreciate that exoskeleton 12 can be alternatively made as a unitary structure having a surface on which patterned surface portion 20 is formed.

As shown in FIG. 1, exoskeleton 12 has an attachable left-hand grip 30 and an attachable right-hand grip 32 for two-handed gripping by a user. A left-side control pad 34, including four pressable control members 36, and a left-side analog stick control 38 are positioned for access by digits of the user's left hand; and a right-side control pad 44, including four control buttons 46, and a right-side analog stick control 48 are positioned for access by digits of the user's right hand. A selection button 64 and a start button 66 are positioned between hand grips 30 and 32. Skilled persons will appreciate that the above-described number of control actuators, control actuator layout pattern, and hand grip arrangement represent only one of numerous possible control actuator and hand grip configurations. The internal electrical components include the actual electronic circuits, controls, and corresponding switch elements for control pads 34 and 44 and buttons 64 and 66.

Patterned surface portion 20, which in this embodiment covers the exterior side surface of main casing 16, includes a surface pattern in the form of an array of mutually spaced-apart cylindrical mating features or bosses 80. Each of hand grips 30 and 32 has a handle mount 82 on which is formed an array of mutually spaced-apart cylindrical mating features or recesses 84. The diameter and depth of each recess 84 and the spacing distances between adjacent ones of recesses 84 are established so that recesses 84 mate with corresponding bosses 80 and provide a snug, releasable attachment of each of hand grips 30 and 32 to main casing 16.

Figure 2:
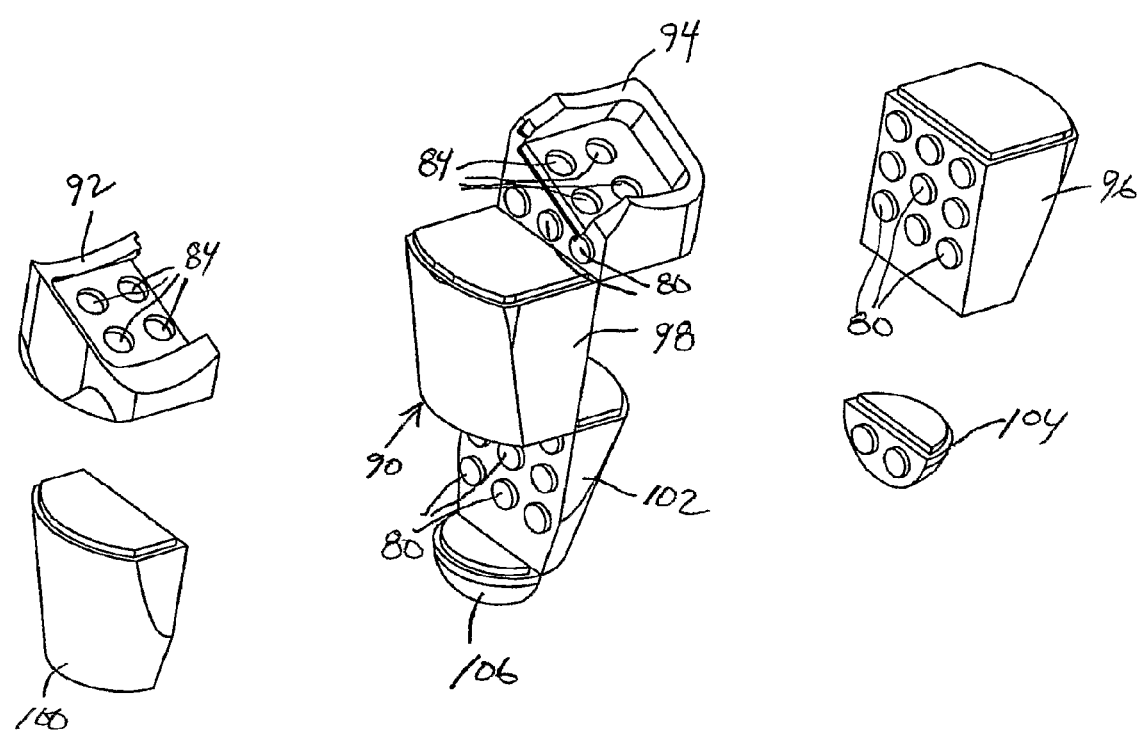
FIG. 2 is an exploded view of the matable building elements assembled to form a hand grip that attaches to an exoskeleton surface of the manual controller of FIG. 1.

FIG. 2 shows the matable building elements that when assembled form left-hand grip 30 shown in FIG. 1. Left hand-grip 30 is made up of five building elements, of which some have different matable features and some have smooth finished surfaces that contribute to the ornamental appearance and ergonomic quality of the hand grip.

Left-hand grip 30 includes a five-section body element 90 to which the remaining building elements attach. A mounting element 92 has three recesses (not shown) that mate with three corresponding bosses 80 of a mounting section 94 of body element 90 to form handle mount 82 (FIG. 1) having eight recesses 84. Handle mount 82 fits over and attaches to hand grip mounting plate 22 (FIG. 1), with eight recesses 84 and eight corresponding bosses 80 in mating relationship. A medial side element 96 has nine bosses 80 that mate with nine corresponding recesses of a center section 98 of body element 90. A lateral side element 100 has nine recesses (not shown) that mate with nine corresponding bosses 80 of a distal section 102 of body element 90. Side elements 96 and 100 contribute to the shape and appearance of the gripping surface of left-hand grip 30. An end piece 104 has two bosses 80 that mate with two corresponding recesses (not shown) of a tip section 106 of body element 90 to form a rounded terminal end of left-hand grip 30. The assembled left-hand grip 30 is shown in FIG. 1 with its side elements 96 and 100 removed. Right-hand grip 32 can be assembled in a corresponding manner to that described above.

Figure 3:
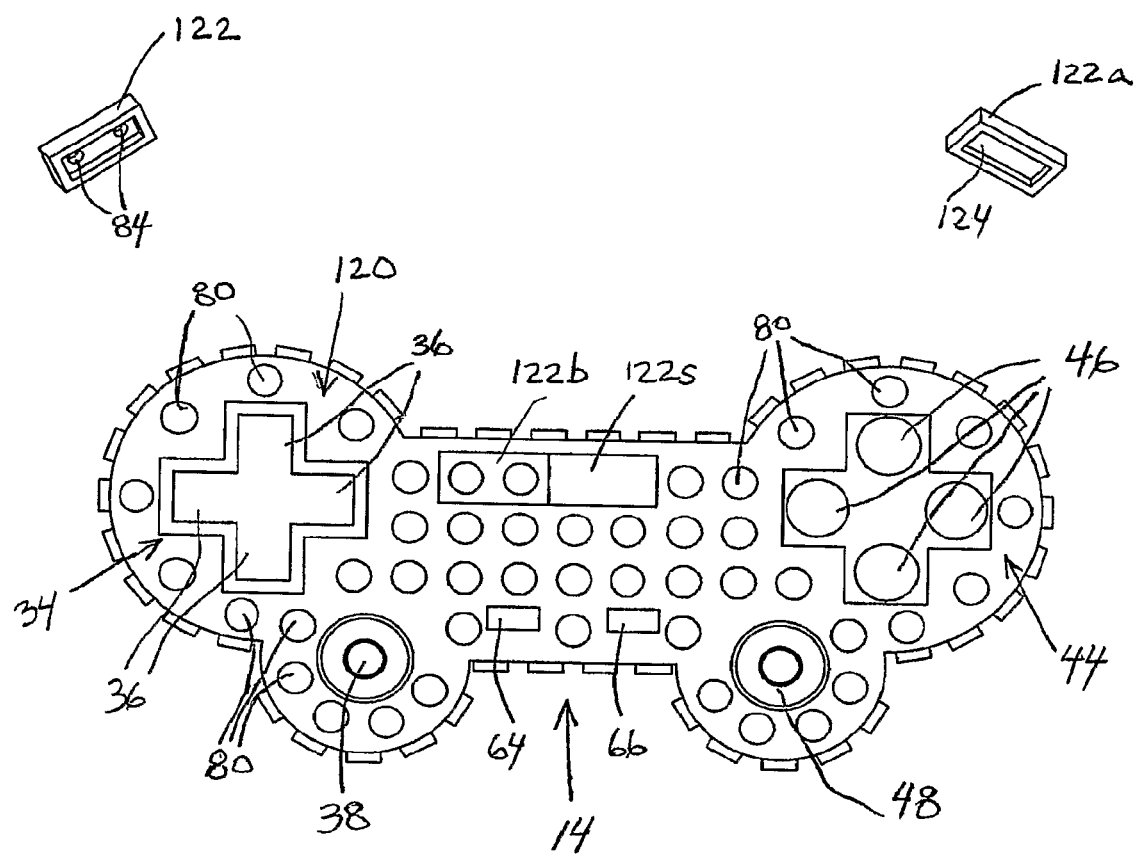
FIG. 3 is a top plan view of a patterned surface portion of the exoskeleton of the manual controller of FIG. 1.

FIG. 3 shows a patterned surface portion 120 covering most of the top surface of main housing 14 (FIG. 1), except for the actuators on control pads 34 and 44. Patterned surface portion 120 includes a surface pattern in the form of an array of mutually spaced-apart bosses 80 in the same array pattern as that of patterned surface portion 20 (FIG. 1).

Patterned surface portion 120 is configured to receive matable building elements 122. Building elements 122 in this embodiment are preferably small molded plastic components that are stackable upon one another, like small bricks, to create a desired object. (Building elements 122 intended to provide a finished surface typically do not have top surface mating features that would enable stacking of another layer of building elements.) Building elements 122 can be of different colors. Suitable building elements 122 include LEGO toy bricks, available from Interlego AG, Zug, Switzerland.

A preferred building element 122 has on its bottom side recesses 84 that are sized to mate with spatially corresponding bosses 80 so that building element 122 can be affixed to and thereby cover part of patterned surface portion 120. Skilled persons will appreciate that a building element 122 having multiple recesses 84 on its bottom side is configured so that adjacent recesses 84 are separated by the same distance as that separating corresponding adjacent bosses 80 in patterned surface portion 120. The spaced-apart bottom side recesses 84 of building element 122 that are sized to mate with spatially corresponding bosses 80 of patterned surface portion 120 define a recess feature pattern that is complementary to patterned surface portion 120. FIG. 3 shows a building element 122*a* that has an open rectangular bottom side recess 124 that is sized to fit over and against lateral arcuate peripheral portions of two adjacent bosses 80 to mate with them in an operational manner. Building element 122*a* defines a surface feature that is matable to bosses 80 in, but not is complementary to, patterned surface portion 120.

Either building element 122 or 122*a* has on its top side the absence or presence of a matable feature. FIG. 3 shows attached to main housing 14 (FIG. 1) a building element 122*s* having a smooth top surface that can be of a color or that contributes to a finished decorative pattern selected by a user. FIG. 3 also shows attached to main housing 14 and positioned adjacent building element 122*s* a building element 122*b* having on its top side two bosses 80 to which another building element 122*b* could mate at its bottom surface.

For purposes of simplicity and uniformity, a user preferably constructs a manual controller with a set of stackable building elements in which the bottom side feature and the top side feature mates with and operationally matches, respectively, the features in a patterned surface portion of the manual controller. Operationally match is defined to mean that a top side feature is matable to the bottom side feature of the same building element. This is the situation illustrated in FIG. 3 and FIGS. 8A, 8B, 8C, and 8D below. A user constructing a manual controller with building elements 122 stacked to form a specific shape could do so, however, by assembling a set of stackable building elements that are included in subsets. A first subset of building elements could be one in which the bottom side feature mates with, but the top side feature does not operationally match, the features of a patterned surface portion of the manual controller. A second subset of building elements could be one in which the bottom side feature mates with, and the top side feature operationally matches, the top side feature of the building elements in the first subset.

Figure 4:
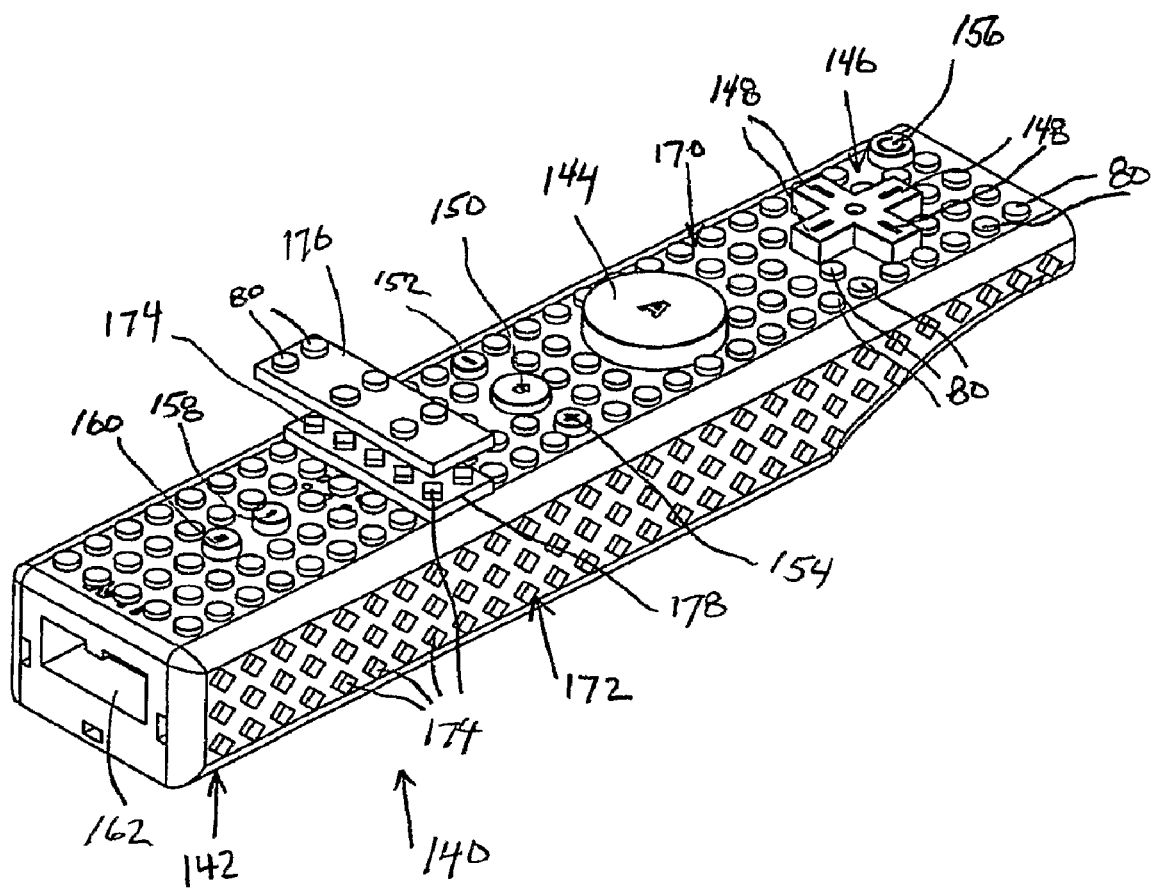
FIG. 4 is an isometric view of a second embodiment of a manual controller that includes a unitary main and hand grip section.

FIG. 4 is an isometric view of a second preferred embodiment of a configurable portable manual controller 140 that includes a unitary main and hand grip section. Manual controller 140 is built around a remote controller in the form of a Wii™ remote controller, which is available from Nintendo of America, Inc., Redmond, Wash., and is implemented with motion sensors that move images on a display in response to user movement of manual controller 140. Manual controller 140 includes an exoskeleton 142 that is a main housing that houses in its interior the electrical components necessary for controlling symbols or images on a display associated with a computer device. As shown in FIG. 4, exoskeleton 142 has a control actuator 144 located between a control pad 146 including four pressable control members 148 and a menu button 150 and two control actuator buttons 152 and 154. A power button 156 is located near the front end, two control actuator buttons 158 and 160 are located near the back end, and a joystick connector receptacle 162 is located in the back surface of manual controller 140. Exoskeleton 142 has a tapered front end bottom surface on which a user can rest his fingers to grasp the controller and operate a trigger device (not shown).

Exoskeleton 142 has patterned surface portions 170 and 172 that together cover most of the exterior of exoskeleton 142. Similar to patterned surface portion 20 of main casing 16 of manual controller 10 shown in FIG. 1, patterned surface portion 170 covering the top surface of manual controller 140 includes a surface pattern in the form of an array of mutually spaced-apart cylindrical mating features or bosses 80. Patterned surface portion 172 covering a side surface of manual controller 140 includes a surface pattern in the form of an array of mutually spaced-apart square mating features 174. For purposes of simplicity, it is preferable to cover exoskeleton 142 with patterned surface portions including arrays of the same mating features.

Figure 5:
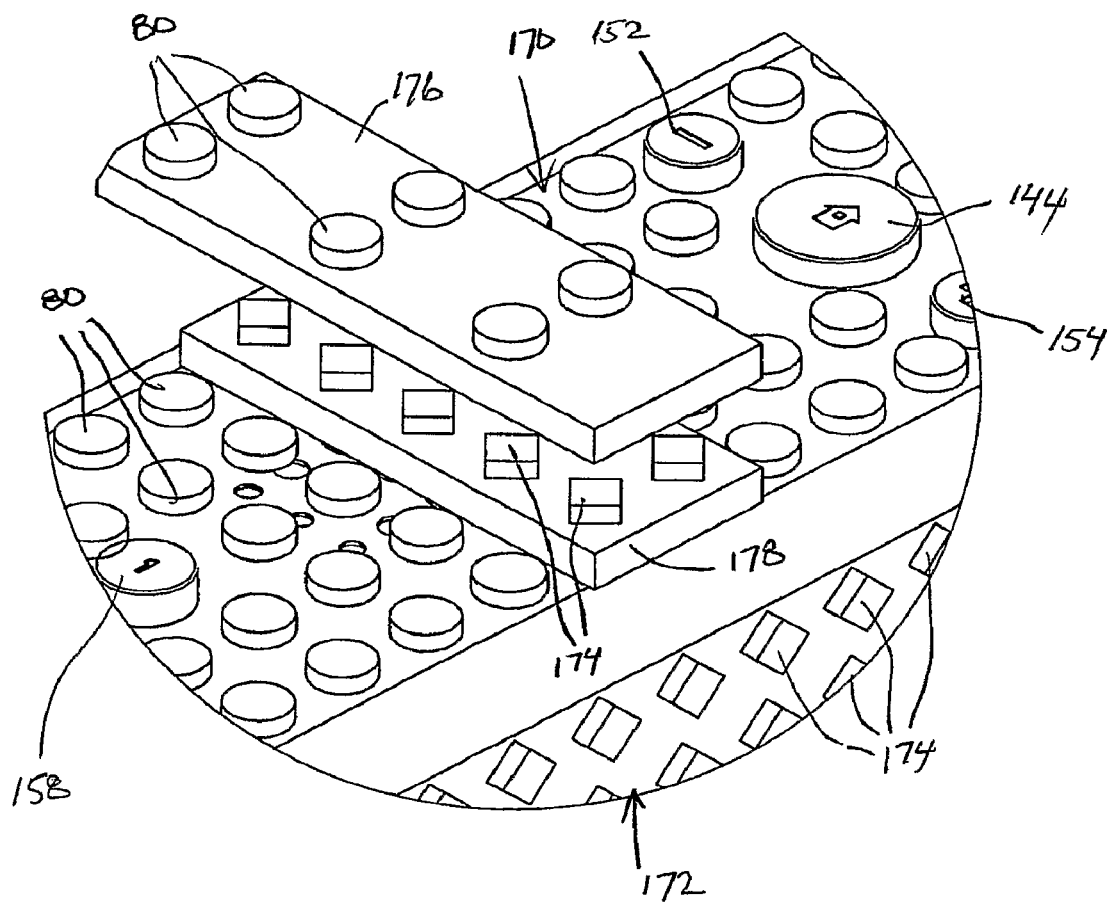
FIG. 5 is an enlarged fragmentary view of the manual controller of FIG. 4 shown with two building elements with different top side mating features.

FIGS. 4 and 5 show two examples of building elements that are matable to manual controller 140. A building element 176 shown positioned above (but not mated to) a building element 178 has top side cylindrical features 80 in a surface pattern that is less densely packed than features 80 in the surface pattern of patterned surface portion 170. Building element 178 shown mated to bosses 80 of patterned surface portion 170 has top side square features 174 of patterned surface portion 172. Building element 178 may have bottom side features that are matable to either cylindrical features 80 or square features 174, depending on the surface of manual controller 140 on which a user intends to build.

Figure 6A:
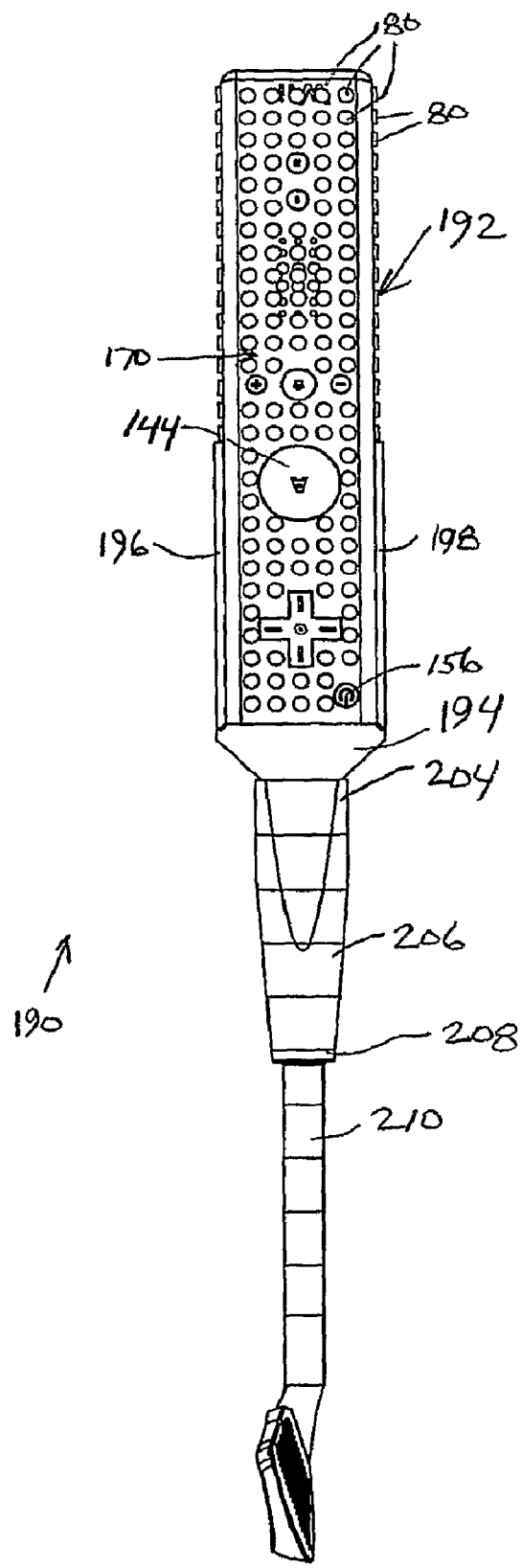
FIGS. 6A, 6B, 6C, and 6D are, respectively, plan, side elevation, isometric, and exploded views of a first example of a customized controller built in the form of a golf club around the type of remote controller shown in FIG. 4.
Figure 6B:
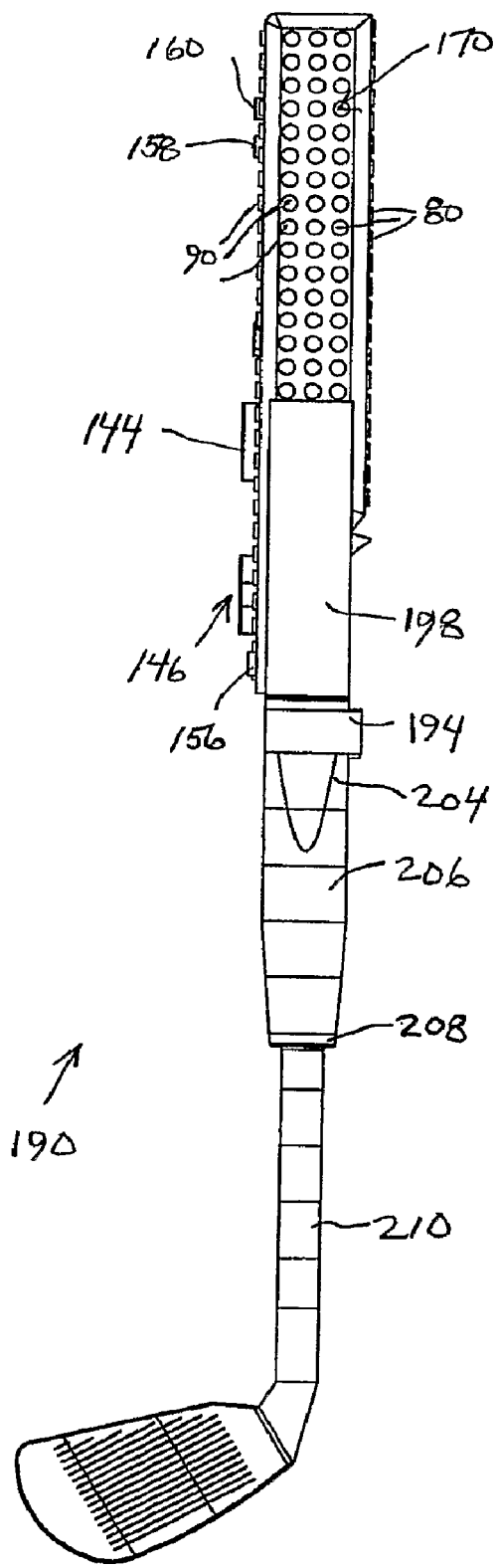
Figure 6C:
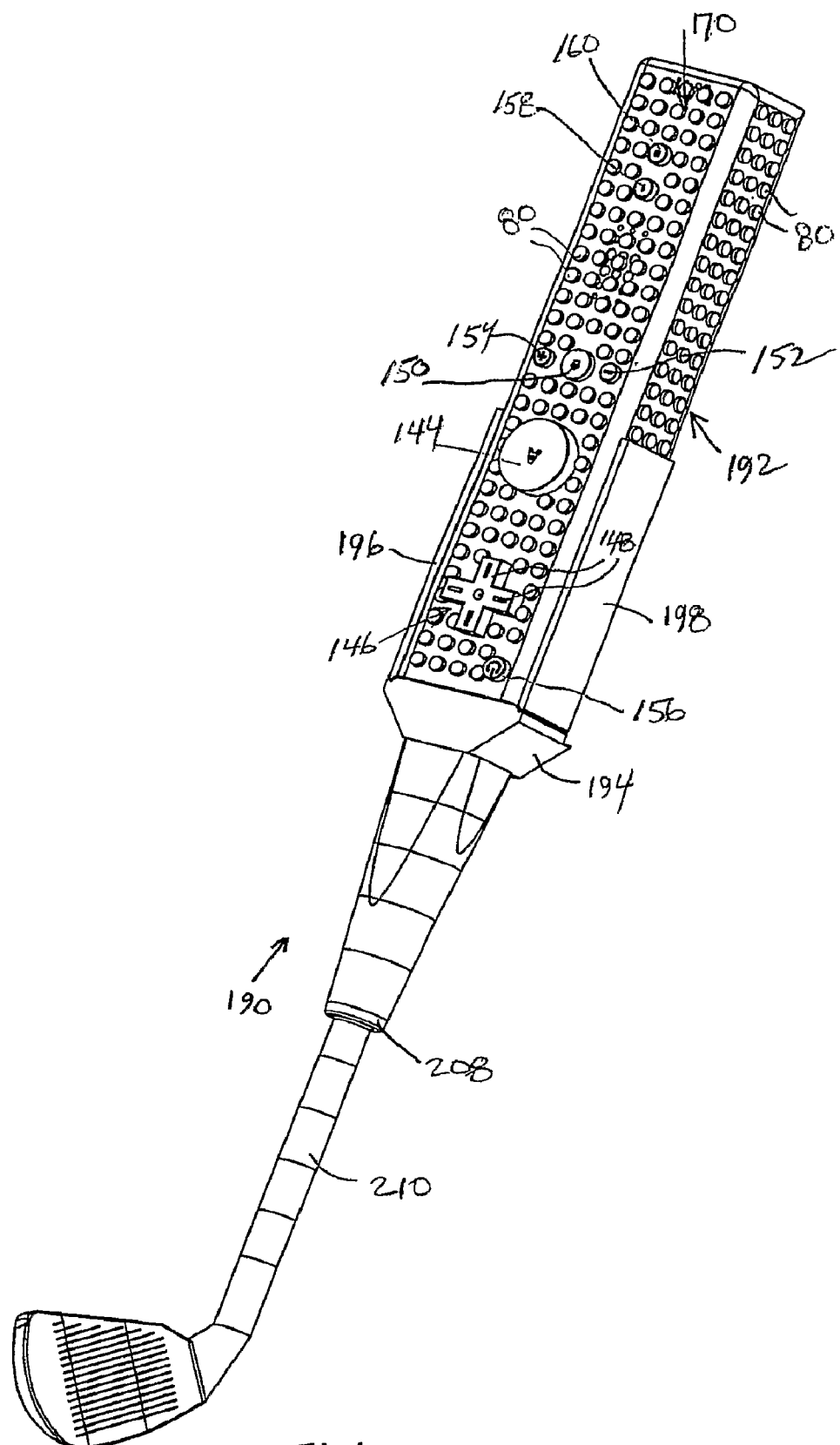
Figure 6D:
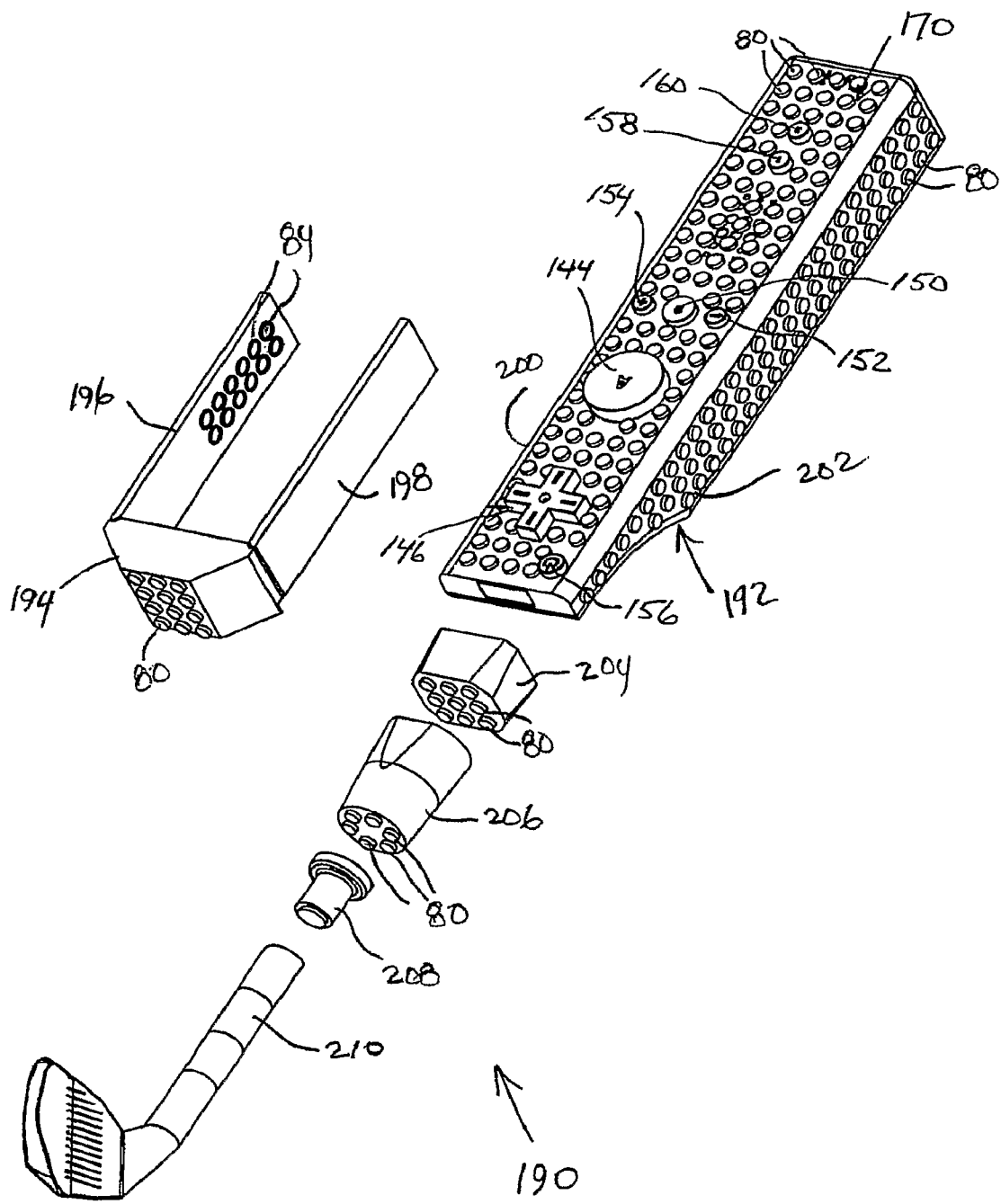

FIGS. 6A, 6B, 6C, and 6D show a customized controller built in the form of a golf club 190 around a remote controller in the form of a Wii™ remote controller. Golf club 190 includes an exoskeleton 192 that has a surface portion 170, which is described above with reference to FIG. 4. As best shown in FIG. 6D, golf club 190 includes five building elements, of which adjacent ones mate with each other and all of which collectively mate with exoskeleton 192. A mounting element 194 includes two side sections 196 and 198 having recesses 84 that mate with corresponding bosses 80 on respective sides 200 and 202 of exoskeleton 192. Golf club shaft components 204, 206, 208, and 210 mate in series connection to form an assembled golf club 190.

Figure 7A:
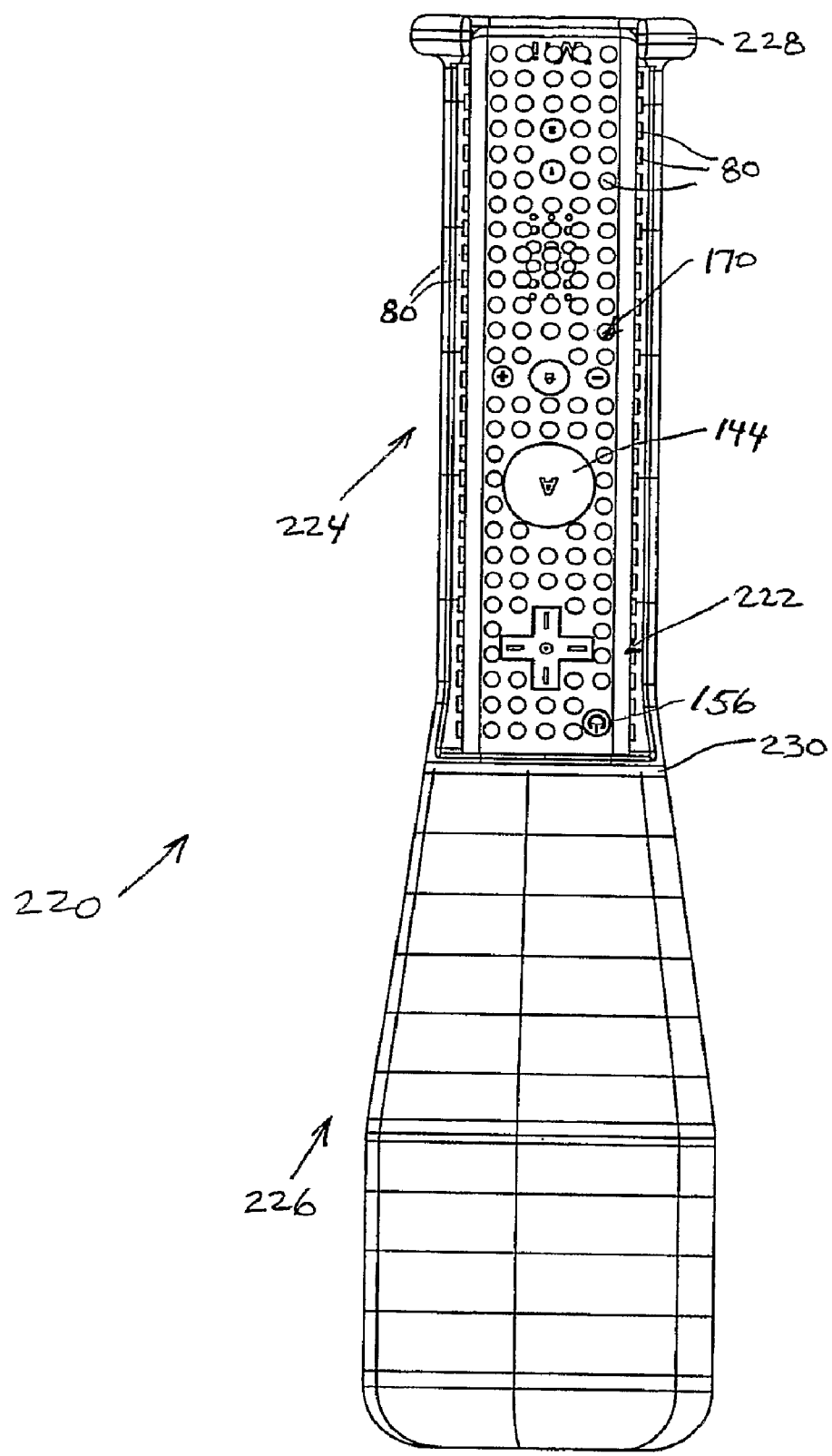
FIGS. 7A, 7B, 7C, and 7D are, respectively, plan, side elevation, isometric, and partly assembled views of a second example of a customized controller built in the form of a baseball bat around the type of remote controller shown in FIG. 4.
Figure 7B:
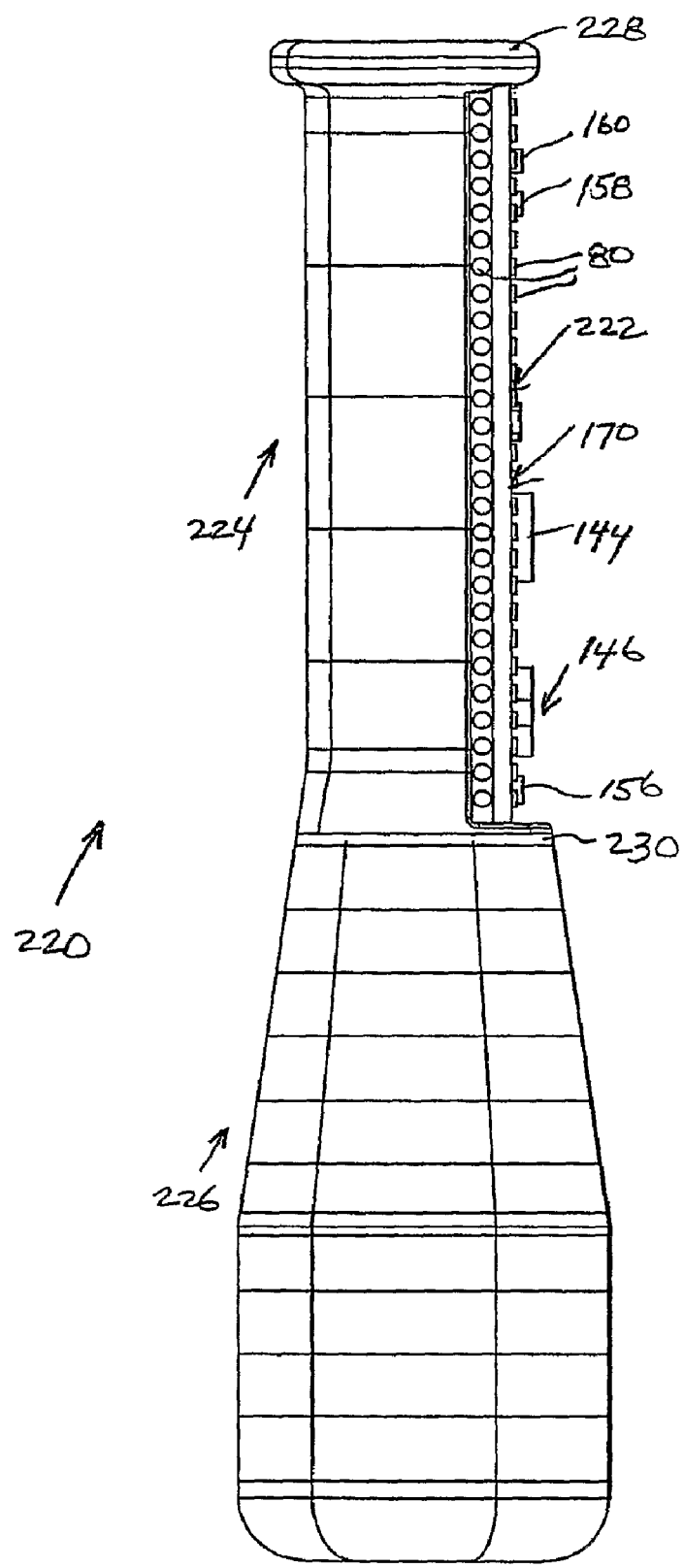
Figure 7C:
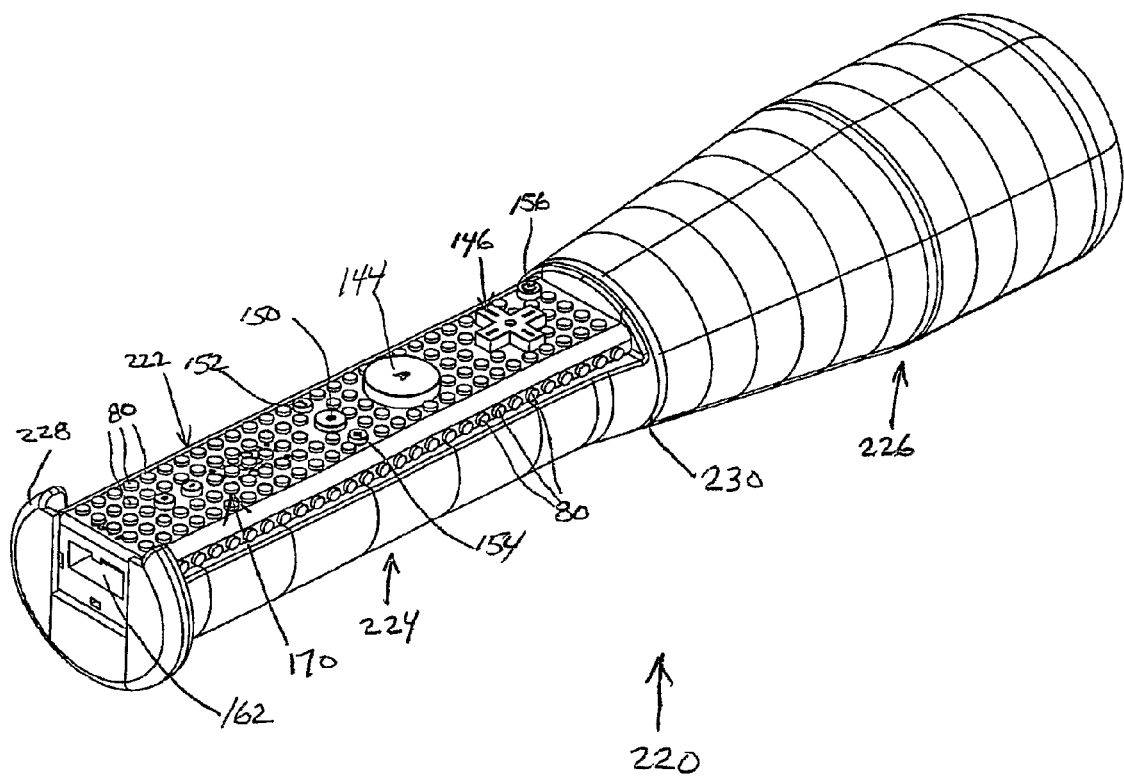
Figure 7D:
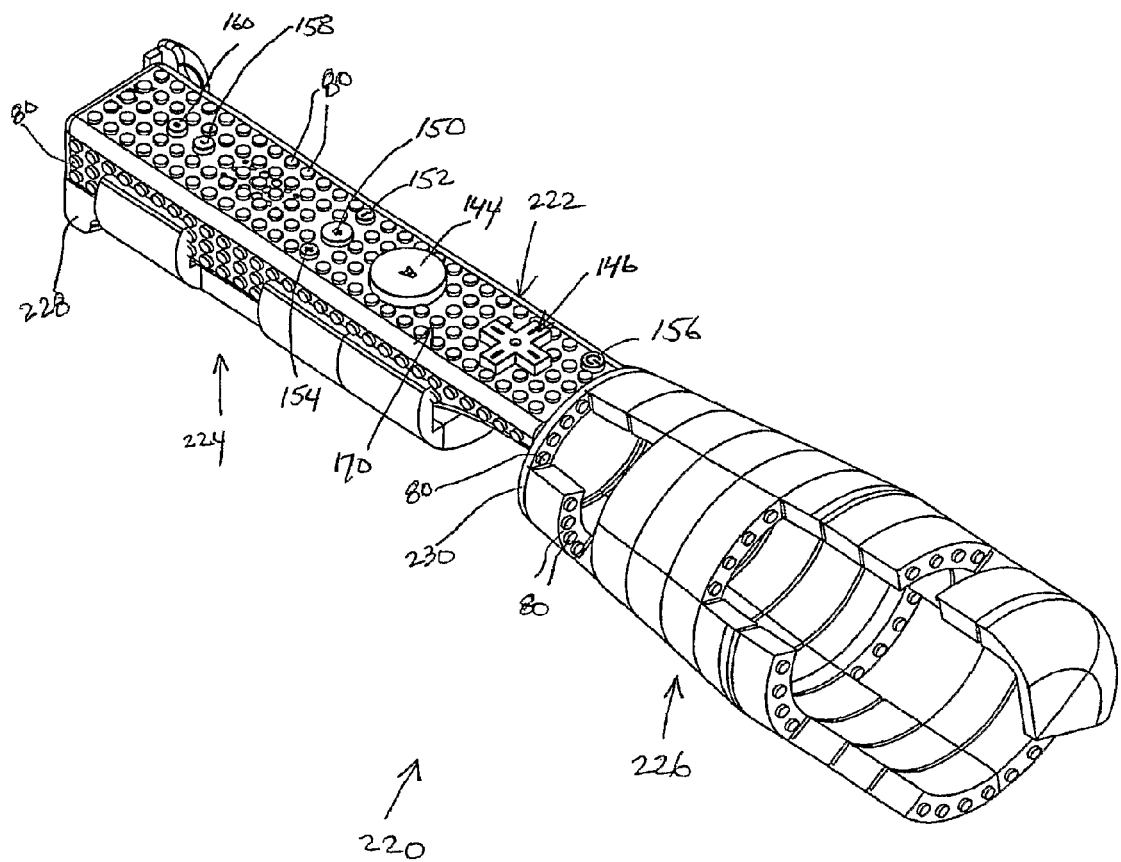

FIGS. 7A, 7B, 7C, and 7D show a customized controller built in the form of a baseball bat 220 around a remote controller in the form of a Wii™ remote controller. Baseball bat 220 includes an exoskeleton 222 that has a surface portion 170, which is described above with reference to FIG. 4. As best shown in FIG. 7D, baseball bat 220 includes five building elements (two of which are partly or completely removed to illustrate mating bosses 80 of exoskeleton 222) mated to exoskeleton 222 to form a bat handle 224 and eleven building elements (several of which partly cut away to show mating bosses 80 on adjacent building elements) mated in series connection to form a bat barrel 226. A building element 228 mates to the rear end of exoskeleton 222 to provide a bat heel, and a building element 230 mates with the front end of exoskeleton 222 to interconnect it with bat barrel 226.

Figure 8A:
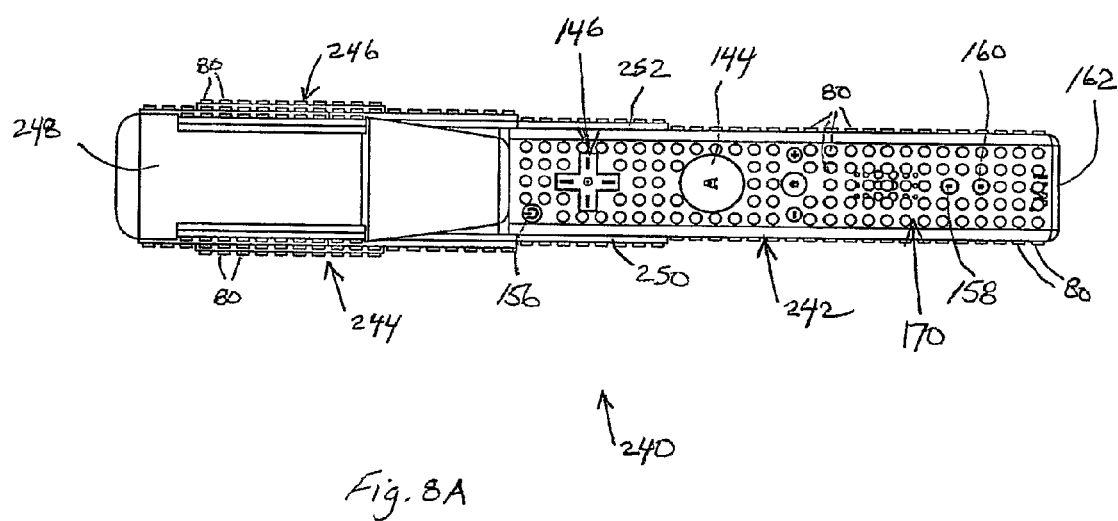
FIGS. 8A, 8B, 8C, and 8D are, respectively, plan, side elevation, isometric, and partly exploded views of a third example of a customized controller built with several layers of mated building elements around the type of remote controller shown in FIG. 4 to form a baseball bat with an unfinished surface.
Figure 8B:
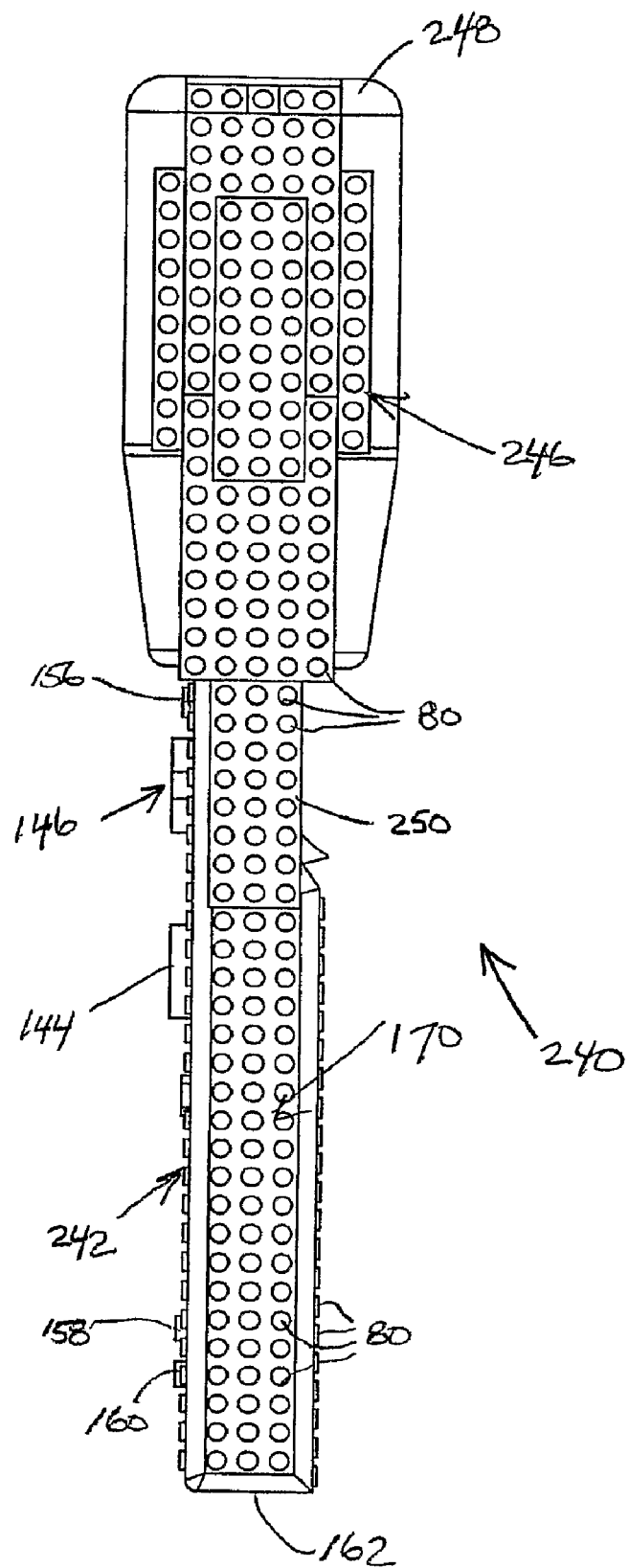
Figure 8C:
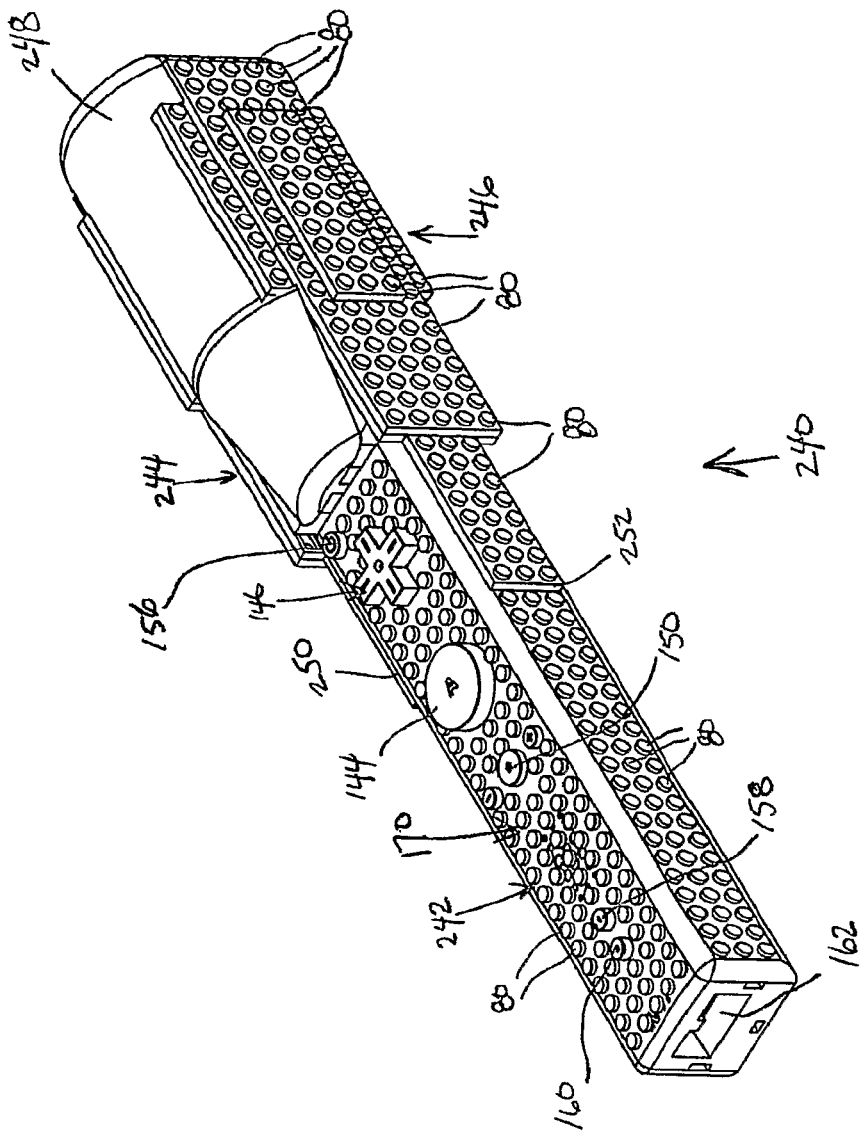
Figure 8D:
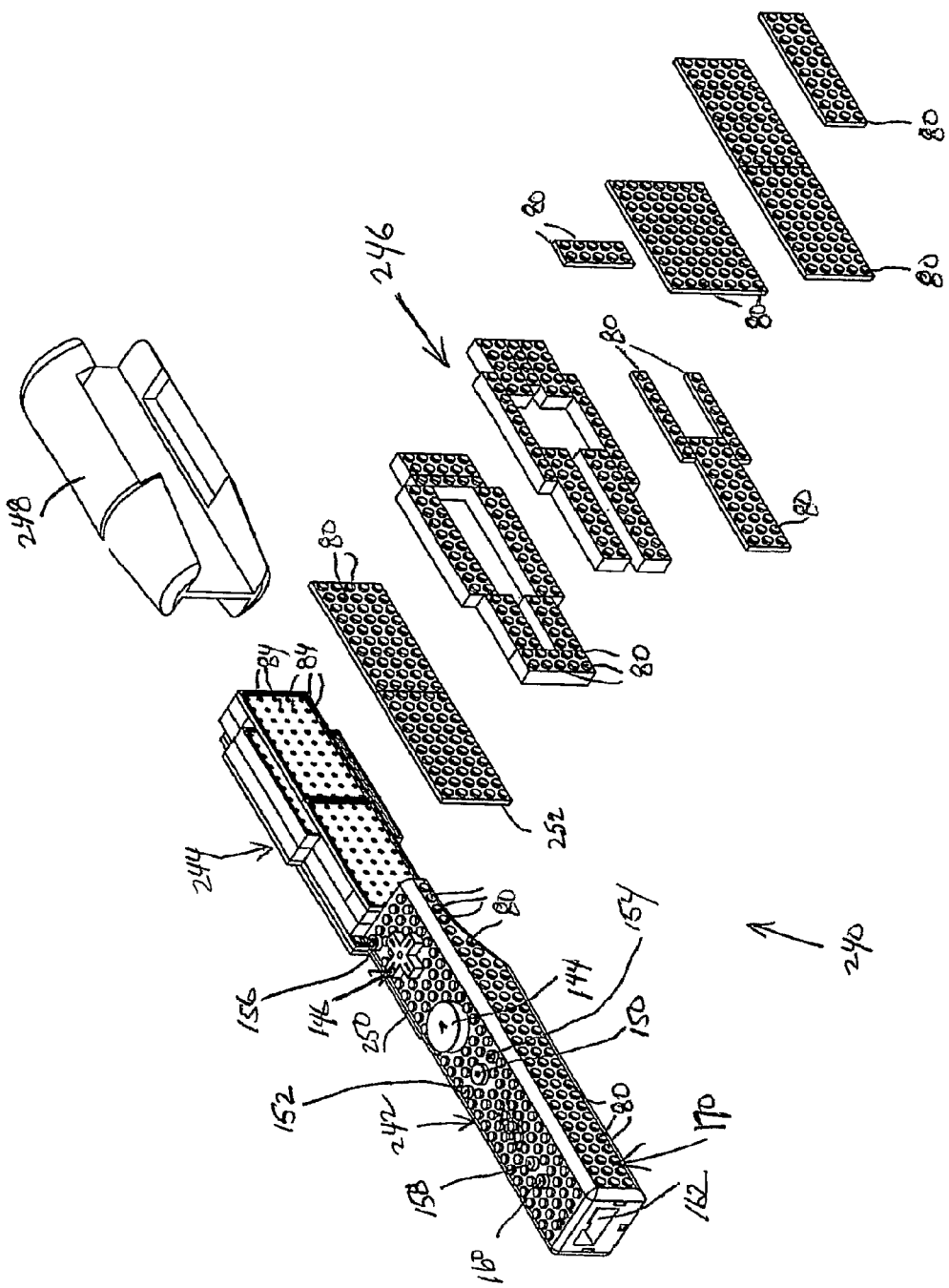

FIGS. 8A, 8B, 8C, and 8D show a customized controller built in the form of a baseball bat 240 around a remote controller in the form of a Wii™ remote controller. Baseball bat 240 includes an exoskeleton 242 that has a surface portion 170, which is described above with reference to FIG. 4. As best shown in FIG. 8D, baseball bat 240 is formed of two multi-layer stacks 244 and 246 of building elements positioned on and mated to either side of a bat barrel core section 248. Rectangular building elements 250 and 252 included in respective multi-layer stacks 244 and 246 have recesses 84 (not shown) that mate with bosses 80 on the sides of exoskeleton 242 at its tapered end to connect bat barrel core section 248 to exoskeleton 240. Unlike baseball bat 220 of FIGS. 7A, 7B, 7C, and 7D, baseball bat 240 has substantially large unfinished surface portions.

Figure 9A:
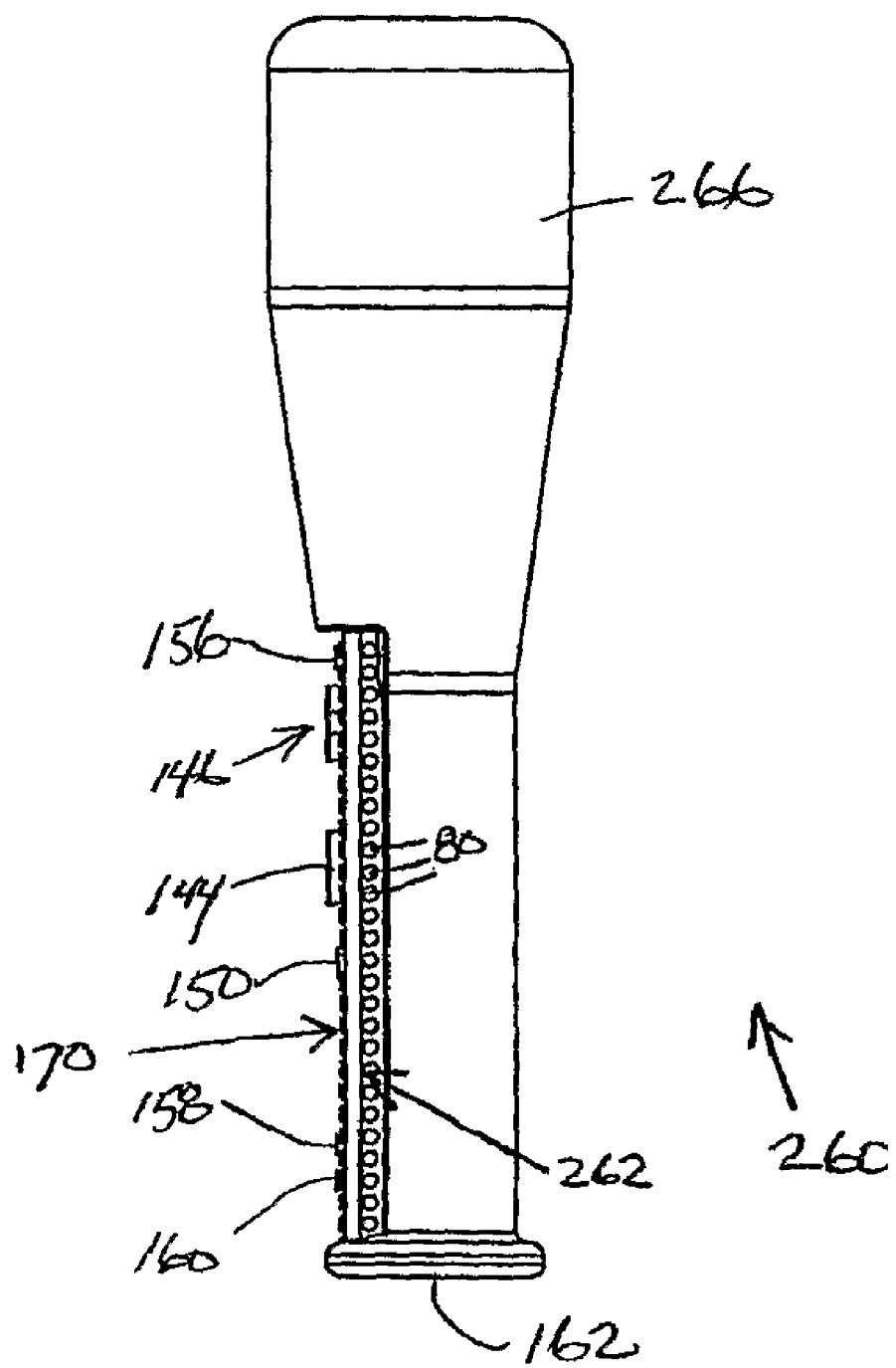
FIGS. 9A, 9B, and 9C are, respectively, side elevation, end, and exploded views of a fourth example of a customized controller built with two matable, styled half-section building elements that partly enclose the type of remote controller of FIG. 4 to form a baseball bat.
Figure 9B:
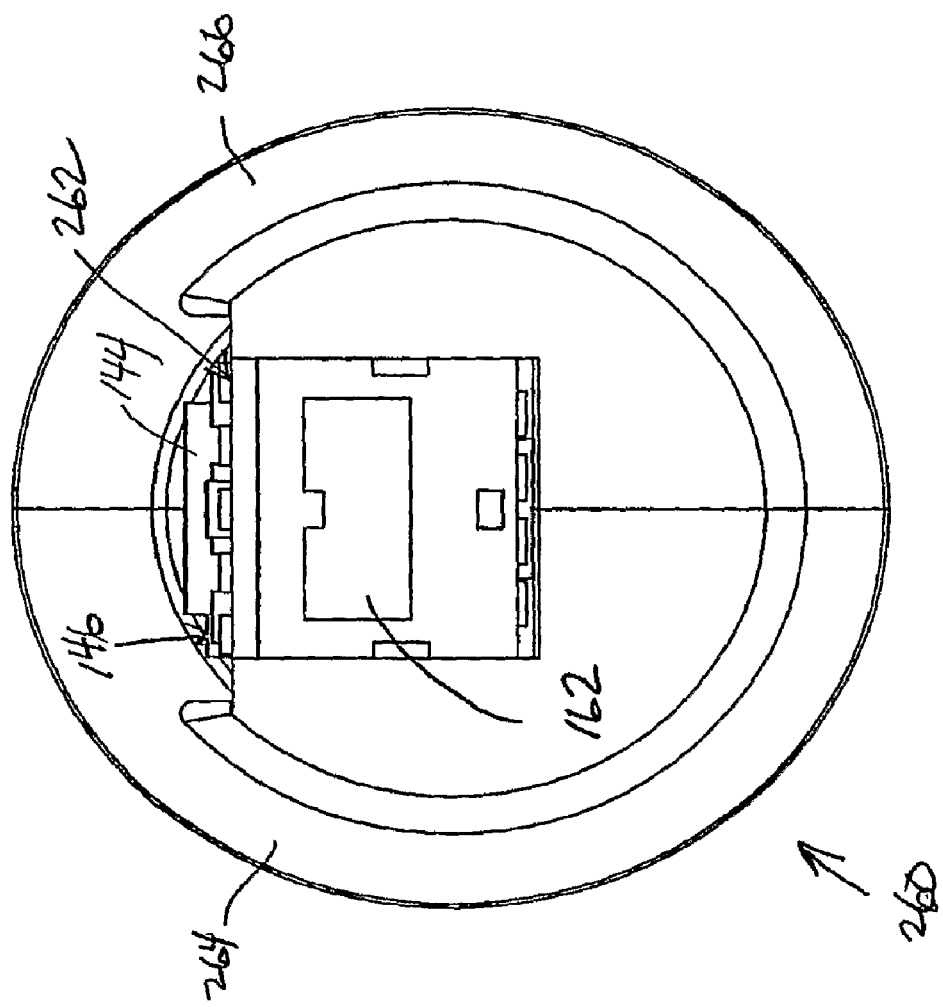
Figure 9C:
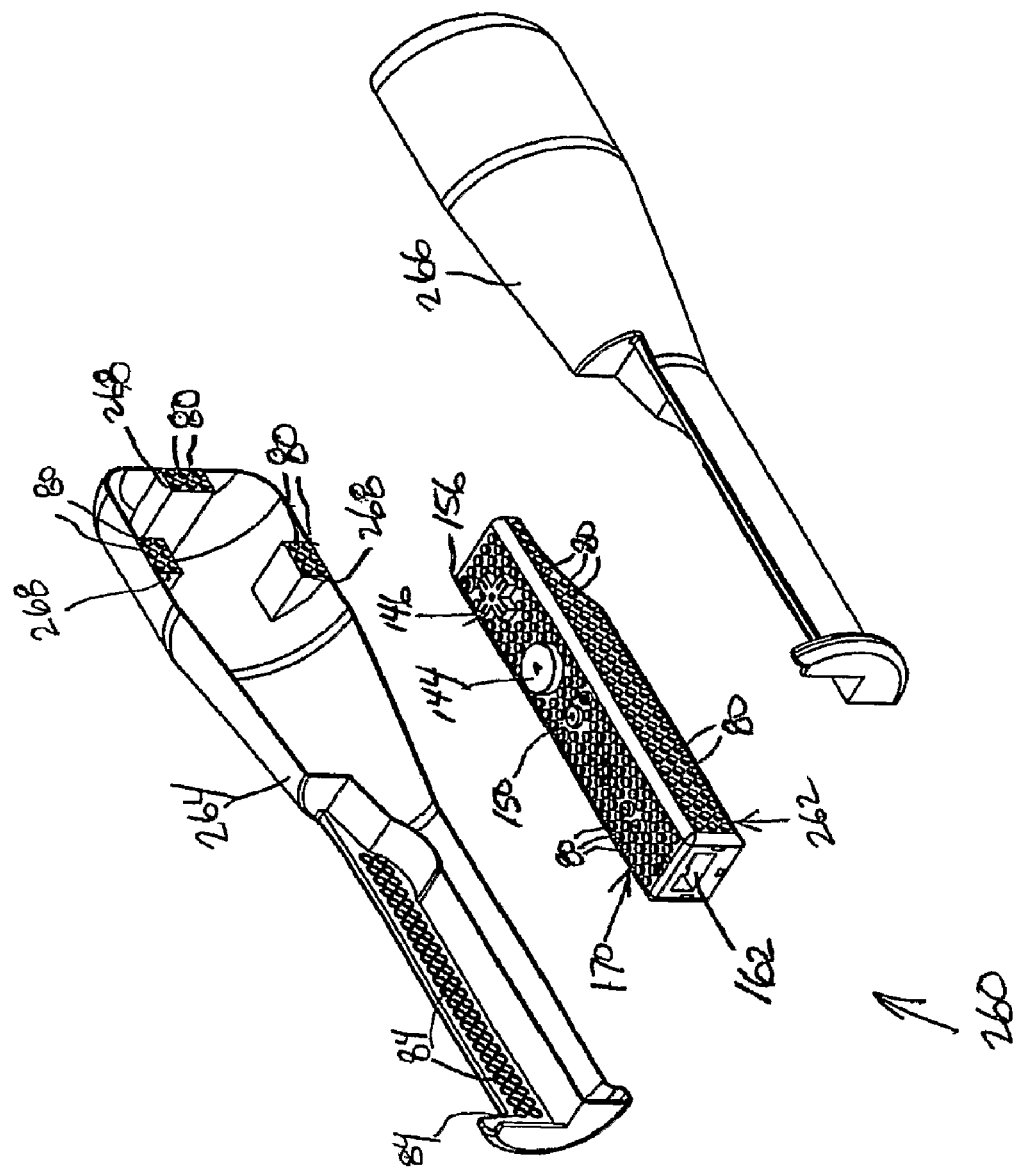

FIGS. 9A, 9B, and 9C show a customized controller built in the form of a baseball bat 260 around a remote controller in the form of a Wii™ remote controller. Baseball bat 260 includes an exoskeleton 262 that has a surface portion 170, which is described above with reference to FIG. 4. As best shown in FIG. 9C, baseball bat 260 is formed with two matable half-section building elements 264 and 266 that resemble longitudinal half-sections of a complete bat, including its handle and barrel. The interior surfaces of building elements 264 and 266 have arrays of recesses 84 that mate with bosses 80 on the side surfaces of exoskeleton 262 to connect building elements 264 and 266 to exoskeleton 262. The interior surface of building element 264 has three mounts 268 for sets of bosses 80 that mate with corresponding recesses 84 on the interior surface (not shown) of building element 266 to connect building elements 264 and 266 together. Baseball bat 260 presents with very few building elements a finished replica of a baseball bat.

It will be obvious to those having skill in the art that many changes may be made to the details of the above-described embodiments without departing from the underlying principles of the invention. The scope of the present invention should, therefore, be determined only by the following claims.

The invention claimed is:

1. A configurable manual controller for manipulating images or symbols on a display and adapted for construction with user-arranged matable building elements to exhibit a customized shape and ornamental appearance, comprising:
    an exoskeleton having an interior region and a patterned surface portion;
    the interior region configured to confine internal electrical components, the internal electrical components operatively connected to control actuators to produce signals for manipulating images or symbols on the display; and
    the patterned surface portion configured to support a set of building elements that are configurable for mating to the patterned surface portion of the exoskeleton and for mating to one another, thereby to enable a user to establish an arbitrary shape and ornamental appearance of the controller.

2. The configurable manual controller of claim 1, in which the set of building elements includes a subset of the building elements having first and second matable features that are matable to each other so that the building elements in the subset are configurable for mated joining to one another for assembly in stacked relationship.

3. The configurable manual controller of claim 2, in which at least some of the building elements in the subset are of different sizes.

4. The configurable manual controller of claim 1, in which the set of building elements includes a subset of the building elements having one or more surface features that are not matable to the building elements in the set.

5. The configurable manual controller of claim 1, in which the patterned surface portion includes a surface feature, and in which the set of building elements includes a subset of building elements of which each has a surface feature that matches the surface feature of the patterned surface portion.

6. The configurable manual controller of claim 1, in which the exoskeleton comprises multiple pieces, one of which has the patterned surface portion.

7. The configurable manual controller of claim 1, in which the exoskeleton is in a unitary structural form.

8. The configurable manual controller of claim 1, in which the patterned surface portion constitutes a first patterned portion, and further comprising the exoskeleton having a second patterned portion.

* * * * *